Patented Mar. 19, 1929.

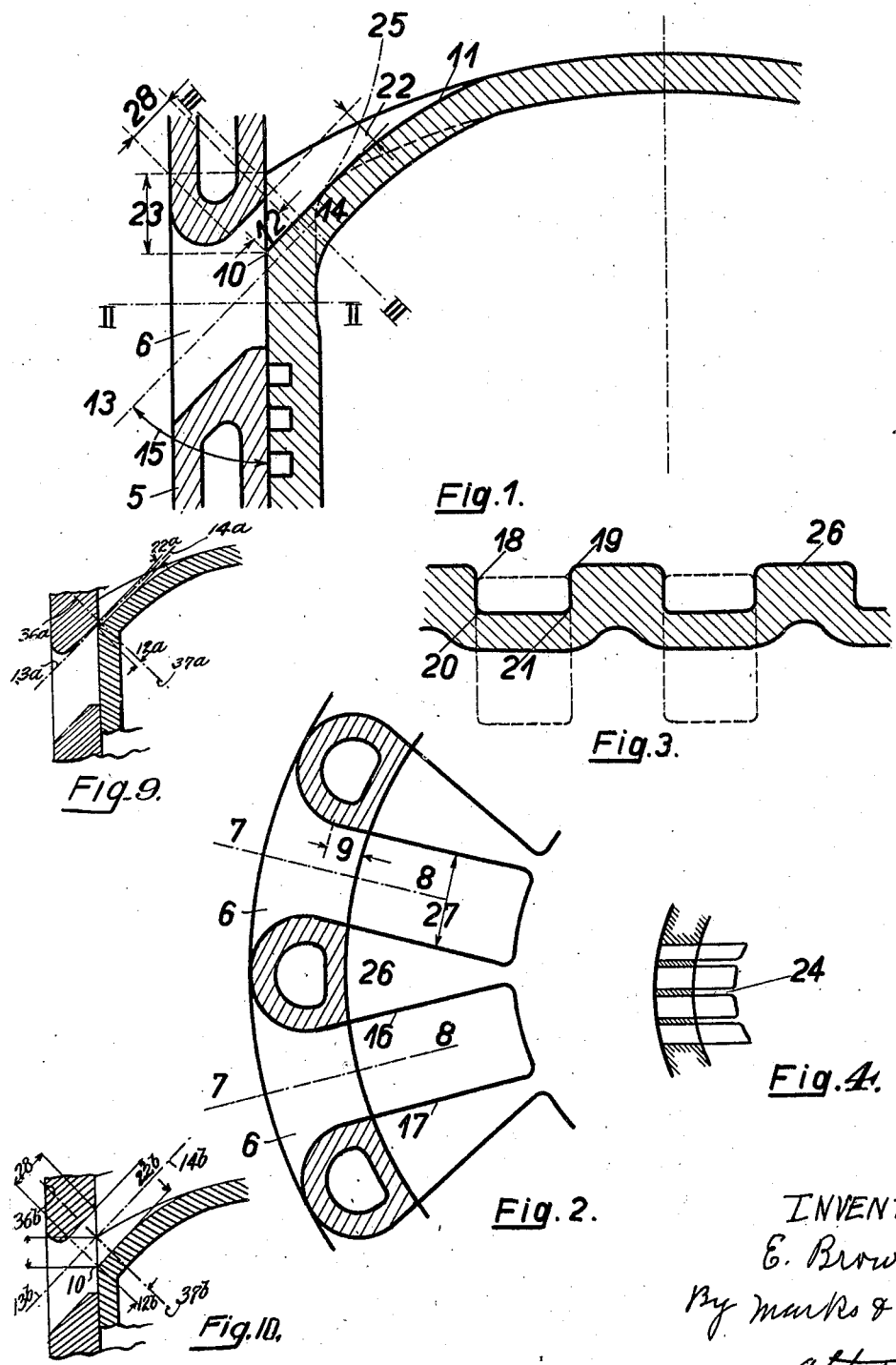

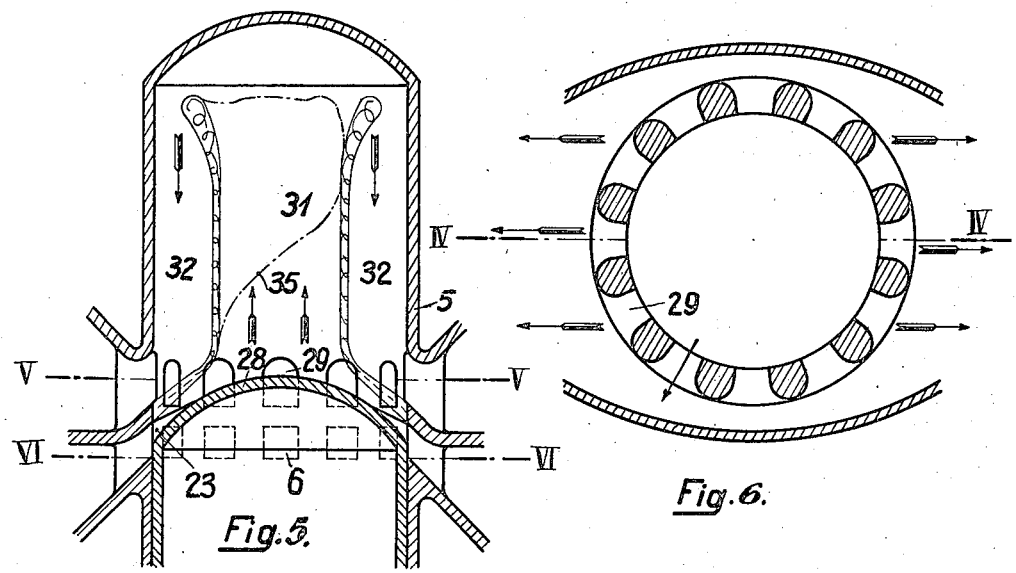
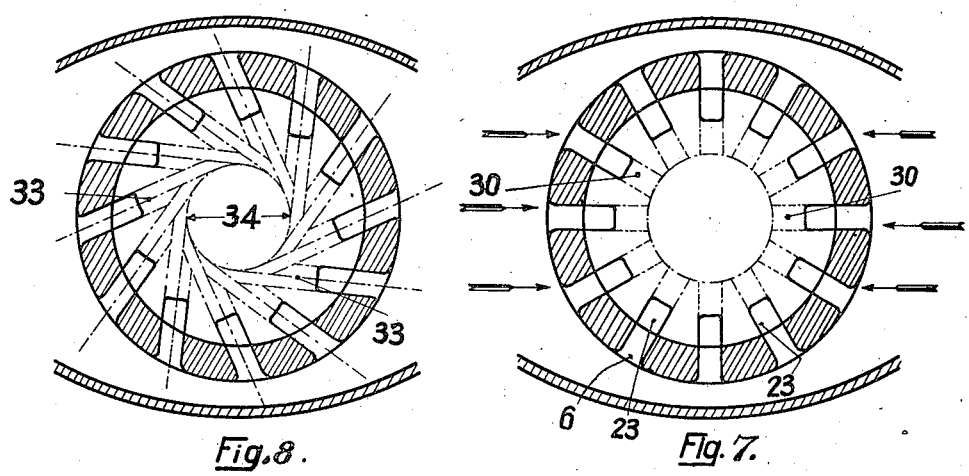

1,705,554

UNITED STATES PATENT OFFICE.

ERIC BROWN, OF BADEN, SWITZERLAND.

SCAVENGING PORT OF TWO-STROKE INTERNAL-COMBUSTION ENGINE.

Application filed September 10, 1925, Serial No. 55,574, and in Germany September 13, 1924.

By virtue of their constructional simplicity and the insensitiveness of their parts to the effects of heat, valveless two-stroke motors with port scavenging, from the end of the working stroke form a particularly important class of internal-combustion engines. The two-stroke motor has however the distadvantage that the cylinder volume swept by its piston has to be increased, beyond what can be utilized for generating power, by a part of the amount of the stroke apportioned to the actuating of the ports.

On this account it is of importance that the conversion of the potential energy of the recompressed scavenging air into kinetic energy, which on entering the cylinder has to be as uniform in direction as possible, and to be free from eddies, should proceed at a high efficiency, so that the quantity of scavenging air, and consequently the portion of the stroke allotted to the admitting thereof, as well as the necessary scavenging air pressure, are restricted to the narrowest possible limits.

The object of the present invention is to convert the potential energy of the precompressed scavenging air into kinetic energy, and to form the scavenging air jets, in a particularly effective manner.

This is attained in a two-stroke cycle internal combustion engine having scavenging air ports controlled by the working piston, said air ports being inclined to the cylinder axis in the direction of the combustion chamber and registering with open recesses in the front face of said piston by the feature that, viewed in a plane through the axis of the cylinder, the walls of each of said air ports and the walls of said recess registering with said air port coact to form a high efficiency expansion nozzle bounded on all sides by walls, said walls lying partly in said cylinder port and partly in said open recess in the front face of the working piston, and the plane at right angles to the axis of said nozzle in which expansion of the precompressed scavenging air is completed lying likewise partly in said cylinder port and partly in said open recess in the front piston face.

In cases wherein the depth in the open recess in the front face of the working piston measured parallel to the cylinder axis, is smaller than the uncovering stroke of the piston, the boundary wall in the cylinder port opposing the boundary wall at the bottom of said recess is prolonged in the direction opposite to flow for such length, that it receives the projection of the uncovering edge at the bottom of the open recess in the front face of the piston when the uncovering stroke of the piston has attained its greatest travel.

Jets of air produced by such nozzles are technically free of eddy currents and are particularly efficient when co-ordinated in collective currents of scavenging air that are to effect scavenging by displacement in precedence to dilution which is caused by turbulent air mixing with the exhaust gases to be expelled.

The invention is thus of first importance to two-stroke cycle internal combustion engines having exhaust ports and scavenging air ports both symmetrically arranged around the cylinder wall. The scavenging process in this class of motors proceeds, as is known, in the following manner:—When the scavenging ports are uncovered, after completion of expansion, the jets of scavenging air unite to form a column which is concentric with the axis of the cylinder and which flows towards the cover of the combustion chamber and is there reversed in direction and turned outwards, driving the residues of combustion gas before it out of the annular space surrounding the column, towards the exhaust ports.

It is most important that any premature formation of eddy currents between the central scavenging column and the flow in the opposite direction in the annular cylindrical space left unoccupied thereby should be avoided.

One object of the present invention, by the transformation of the mouths of the scavenging air ports into high efficiency nozzles, is to enable such scavenging columns to be built up free from deleterious eddy currents by co-ordinating groups of air jets delivered from such nozzles, and the kinetic energy of which is unidirectional, in one collective current.

The invention is illustrated by way of example in the accompanying drawings in which:

Figure 1 illustrates in longitudinal section through the cylinder axis, Figure 2 in section through the plane II—II in Figure 1 and Figure 3 in section through the plane III—III in Figure 1, an application of the invention to an internal-combustion engine with valveless scavenging from the end of the working stroke.

Figure 4 illustrates an arrangement of nozzles ranged close beside one another.

Figure 5 shows a cylinder and piston constructed according to the invention in section on the line IV—IV in Figure 6.

Figure 6 in section on the line V—V in Figure 5, and

Figure 7 in section on the line VI—VI in Figure 5.

Figure 8 is a section corresponding to Figure 7 of a modified form of the invention.

Figures 9 and 10 are longitudinal sections similar to Figure 1 but with piston in different positions.

In these drawings, 5 is the cylinder, with the scavenging ports 6, the axes 7—8 of which converge towards the axis of the cylinder. The ports in the present example are rectangular in cross section and their lateral walls are parallel to one another in the part 9 of their length. The covering edge 10 of the piston which may be rounded off, forms the starting point of a bevel 10—11 in the base of a recess or notch in the front face of the piston, which bevel at its commencement is approximately parallel to the part 28 of the upper wall of the scavenging port, the axis 13—14 Figure 1 of which is inclined at an angle 15 to the cylinder wall, so as to form at the outlet mouth of the scavenging port, with the surface 10—11, and the lateral boundary walls 16 and 17 of the cavity, a nozzle of rectangular cross section 18, 19, 20, 21 (Figure 3). In Figure 1 the instantaneous length of this nozzle is the distance between the arrow heads indicated by 12, and its height is the distance between the arrow heads indicated by 22, these dimensions increasing as the piston advances.

Figures 9 and 10 show the manner in which the size and location of the nozzle are dependent on the position of the piston during its controlling travel. In Figure 9 the piston has just commenced to uncover the port and the nozzle has just attained a length $12^a$ along its axis and a height of $22^a$. In Figure 10, the piston is shown in a lower position than that indicated in Figure 1 and the length and height of the nozzle are $12^b$ and $22^b$ respectively. In cases where the depth 23 of the recess is less than the uncovering travel of the piston as indicated in Figure 10, the boundary wall 28 in the cylinder port opposing the boundary wall at the bottom of the recess in the piston face is prolonged in the direction opposite to flow for such length that it receives the projection of the uncovering edge 10. The plane in which expansion of the precompressed scavenging air is completed is situated at right angles to the axis 13—14 of the nozzle and is shown in section in Figure 9 by the line $36^a$—$37^a$, in Figure 1 by the line 36—37 and in Figure 10 by the line $36^b$—$37^b$, the axes of the nozzle being $13^a$—$14^a$, 13—14 and $13^b$—$14^b$ respectively.

In Figure 2, the axes 7—8 of the scavenging ports converge radially but they may also be parallel to one another. Besides parallel-walled nozzles, such as those indicated in the figures, divergent or convergent walls may be employed if circumstances require it.

Figure 4 illustrates an arrangement of port nozzles ranged close beside one another, which may be formed by thin bridge pieces, or by inserted plates. The lateral boundary walls 24 of the recesses in the front face of the piston are correspondingly narrower. If the air jets of some or all of the scavenging port nozzles are to be deflected towards the cylinder cover immediately upon entering the cylinder space, the bottoms of the recesses in the front face of the piston will follow the course 10—25 instead 10—11. The tooth-shaped metal masses 26 are effectively cooled by the cold scavenging air. The recesses 23 may also be arranged around the front face of the piston, and therefore opposite to exhaust ports, as a result of which the front face of the piston would become completely symmetrical in shape.

It is advisable to make at least the part 9 of the scavenging nozzles, and also the walls of the recesses 23 smooth. In order to obviate shocks at the part 12 of the nozzle owing to inexact agreement of the recesses in the front face of the piston with the scavenging ports it is advisable to make the width 27 of the recesses a little greater than that of the ports.

In Figures 5 to 8, 6, 6 are the scavenging port nozzles, which are uniformly distributed round the periphery of the bore of the cylinder 5, and, together with the recesses 23 registering therewith in the front face of the piston 28, are constructed in the manner described above so as to form complete expansion nozzles.

Upon these ports being uncovered after expansion has taken place in the interior of the cylinder, the purely kinetic jets 30 unite into a column 31 having sharply marked boundaries. 32 is the annular space surrounding the scavenging column and from which the combustion residues are expelled through the exhaust ports 29 as above described.

It is important that the pressure in front of all the scavenging port nozzles should be equalized and also the pressure behind all the exhaust ports, for to the extent that this is not the case the object of the invention will fail to be attained.

The action of small differences of pressure at these places may be compensated for by an additional rotary movement of the column of scavenging air about its axis. This rotary movement, moreover, may exert a favourable action on the combustion process.

Figure 8 illustrates in section on the line VI—VI in Figure 4, the production of this rotary movement by arranging the axes 33 of the scavenging port nozzles, looked at in a plane perpendicular to the axis of the cylinder, as tangents to a circle 34 concentric with the said axis. By this means helical pressure compensating stream lines 35, are produced as indicated in Figure 5.

When applying the invention to double acting motors with piston rods in the combustion chamber, these rods form the core of the columns of scavenging air, and are cooled perfectly symmetrically by the latter.

What I claim is:

1. In a two-stroke cycle internal combustion engine having scavenging air ports controlled by the working piston, said air ports being inclined to the cylinder axis in the direction of the combustion chamber, having open recesses in the front face of the said piston, said recesses registering with said air ports, improved scavenging means characterized by the feature that, viewed in a plane through the axis of the cylinder, the walls of each of said air ports and the walls of said recess registering with said air port coact to form a high efficiency expansion nozzle, bounded on all sides by walls, said walls lying partly in said cylinder port and partly in said open recess in the front face of the working piston and the plane at right angles to the axis of said nozzle in which expansion of the precompressed scavenging air is completed lying likewise partly in said cylinder port and partly in said open recess in the front piston face.

2. In a two-stroke internal combustion engine as claimed in claim 1, wherein the depth of the open recess in the front face of the piston measured parallel to the cylinder axis, is smaller than the uncovering stroke of the piston, the boundary wall in the cylinder port opposing the boundary wall at the bottom of said recess is prolonged in the direction opposite to flow for such length that it receives the projection of the uncovering edge at the bottom of the open recess in the front face of the piston when the uncovering stroke of the piston has attained its greatest travel.

3. In a two-stroke internal combustion engine as claimed in claim 1, wherein a plurality of high efficiency expansion nozzles are arranged in a manner known per se substantially symmetrically around the cylinder wall and the front face of the piston, the axes of the said nozzles viewed in a plane at right angles to the cylinder axis being substantially radial to the said axis.

4. In a two-stroke internal combustion engine as claimed in claim 1, wherein a plurality of high efficiency expansion nozzles are arranged around the cylinder wall and the front face of the piston, the axes of said nozzles being, in a manner known per se, substantially tangential to a circle concentric with and at right angles to the axis of the cylinder.

In testimony whereof I have signed my name to this specification.

ERIC BROWN.